US008307030B1

(12) United States Patent
Hu

(10) Patent No.: US 8,307,030 B1
(45) Date of Patent: Nov. 6, 2012

(54) LARGE-SCALE TIMER MANAGEMENT

(75) Inventor: Hanzhong Hu, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 164 days.

(21) Appl. No.: 12/763,869

(22) Filed: Apr. 20, 2010

(51) Int. Cl.
*H04L 12/56* (2006.01)

(52) U.S. Cl. .................. 709/203; 709/220; 370/389

(58) Field of Classification Search .......... 709/203, 709/224, 228; 713/200
See application file for complete search history.

(56) References Cited

U.S. PATENT DOCUMENTS

| | | | |
|---|---|---|---|
| 3,962,681 A | 6/1976 | Requa et al. | |
| 4,032,899 A | 6/1977 | Jenny et al. | |
| 4,600,319 A | 7/1986 | Everett, Jr. | |
| 4,625,081 A * | 11/1986 | Lotito et al. | 379/88.26 |
| 5,408,539 A | 4/1995 | Finlay et al. | |
| 5,490,252 A | 2/1996 | Macera et al. | |
| 5,495,522 A * | 2/1996 | Allen et al. | 379/202.01 |
| 5,509,123 A | 4/1996 | Dobbins et al. | |
| 5,568,471 A | 10/1996 | Hershey et al. | |
| 6,011,795 A | 1/2000 | Varghese et al. | |
| 6,018,765 A | 1/2000 | Durana et al. | |
| 6,148,335 A | 11/2000 | Haggard et al. | |
| 6,161,138 A * | 12/2000 | Gross et al. | 709/225 |
| 6,182,146 B1 | 1/2001 | Graham-Cumming, Jr. | |
| 6,321,338 B1 | 11/2001 | Porras et al. | |
| 6,339,584 B1 * | 1/2002 | Gross et al. | 370/225 |
| 6,392,996 B1 | 5/2002 | Hjalmtysson | |
| 6,499,088 B1 | 12/2002 | Wexler et al. | |
| 6,501,752 B1 | 12/2002 | Kung et al. | |
| 6,563,796 B1 | 5/2003 | Saito | |
| 6,594,268 B1 | 7/2003 | Aukia et al. | |
| 6,598,034 B1 | 7/2003 | Kloth | |
| 6,735,201 B1 | 5/2004 | Mahajan et al. | |
| 6,751,663 B1 | 6/2004 | Farrell et al. | |
| 6,826,713 B1 | 11/2004 | Beesley et al. | |
| 6,889,181 B2 | 5/2005 | Kerr et al. | |
| 6,983,294 B2 | 1/2006 | Jones et al. | |
| 6,985,956 B2 | 1/2006 | Luke et al. | |

(Continued)

FOREIGN PATENT DOCUMENTS

WO 9836532 A1 8/1998

(Continued)

OTHER PUBLICATIONS

"The CAIDA Web Site," www.caida.org/, 2002, 1 pg.

(Continued)

*Primary Examiner* — Khanh Dinh
(74) *Attorney, Agent, or Firm* — Shumaker & Sieffert, P.A.

(57) ABSTRACT

In general, techniques are described for managing timers for large scale service statistics collection. For example, as described herein, a network device includes a timing wheel data structure defining a plurality of slots. A rate limiter selects up to a rate limit value of timer events stored in a first one of the slots, wherein the rate limit value is less than a total number of the plurality of timer events stored in the first one of the time slots. A timer service module services the selected timer events during the first time interval, wherein the timer service module defers at least one of the unserviced timer events from the first one of the slots to a second one of the slot. During a second time interval, the timer service module services at least one of the timer events deferred from the first one of the slots.

25 Claims, 9 Drawing Sheets

U.S. PATENT DOCUMENTS

| | | | |
|---|---|---|---|
| 7,120,931 | B1 | 10/2006 | Cheriton |
| 7,139,242 | B2 | 11/2006 | Bays |
| 7,231,459 | B2 | 6/2007 | Saraph et al. |
| 7,386,108 | B1 | 6/2008 | Zave et al. |
| 7,430,261 | B2 * | 9/2008 | Forest et al. ............... 375/364 |
| 7,633,944 | B1 | 12/2009 | Chang et al. |
| 7,983,769 | B2 * | 7/2011 | Chaffee et al. ............... 700/29 |
| 2002/0163932 | A1 | 11/2002 | Fischer et al. |
| 2003/0120769 | A1 | 6/2003 | McCollom et al. |
| 2003/0214913 | A1 | 11/2003 | Kan et al. |
| 2006/0109376 | A1 * | 5/2006 | Chaffee et al. ............. 348/423.1 |
| 2007/0016702 | A1 | 1/2007 | Pione et al. |
| 2007/0058558 | A1 | 3/2007 | Cheung et al. |
| 2010/0226342 | A1 * | 9/2010 | Colling et al. ............... 370/336 |

FOREIGN PATENT DOCUMENTS

| | | | |
|---|---|---|---|
| WO | 02084920 | A2 | 10/2002 |

OTHER PUBLICATIONS

"About Endace," www.endace.com/, 2002, 1 pg.

"Cisco IOS NetFlow," www.cisco.com/warp/public/732/Tech/nmp/netflow/index.shtml, 2002, 1 pg.

Weaver, A.C. et al., "A Real-Time Monitor for Token Ring Networks," Military Communications Conference, 1989, MILCOM '89, Oct. 1989, vol. 3, pp. 794-798.

Dini, P. et al., "Performance Evaluation for Distributed System Components," Proceedings of IEEE Second International Workshop on Systems Management, Jun. 1996, pp. 20-29.

Integrated Services Adapter, 2000, Cisco Systems, Data Sheet, pp. 1-6, http://www.cisco.com/warp/public/cc/pd/ifaa/svaa/iasvaa/prodlit/ism2_ds.pdf.

"Well-Known TCP Port Number," www.webopedia.com, 2004, 3 pgs.

"TCP Packet Field Descriptions," www.ipanalyser.co.uk, Analyser Sales Ltd., Copyright 2003, 2 pages.

Michael Egan, "Decomposition of a TCP Packet," www.passwall.com, 3 pages, Aug. 7, 2000.

Mark Gibbs, "A Guide to Original SYN," www.nwfusion.com, Network World, Nov. 2000, 4 pages.

"Sample TCP/IP Packet," www.passwall.com, Version 0.0.0 @ 03:55/Aug. 7, 2000, Copyright 2002, 6 pages.

D.J. Bernstein, "SYN Cookies," http://cr.yp.to/syncookies.html, Oct. 2003, 3 pages.

Jonathan Lemon, "Resisting SYN Flood DoS Attacks with a SYN Cache," http://peoplefreebsd.org/~jlemon/papers/syncache.pdf, 2002, 9 pages.

Stuart Staniford et al., "Practical Automated Detection of Stealthy Portscans," http://downloads.securityfocus.com/library/spice-ccs2000.pdf, 16 pages.

PCI Technology Overview, Feb. 2003, www.cs.unc.edu/Research/stc/FAQs/pci-overview.pdf, 22 pgs.

Varghese et al., "Hashed and Hierarchical Timing Wheels: Efficient Data Structures for Implementing a Timer Facility," Feb. 14, 1996, 24 pp.

* cited by examiner

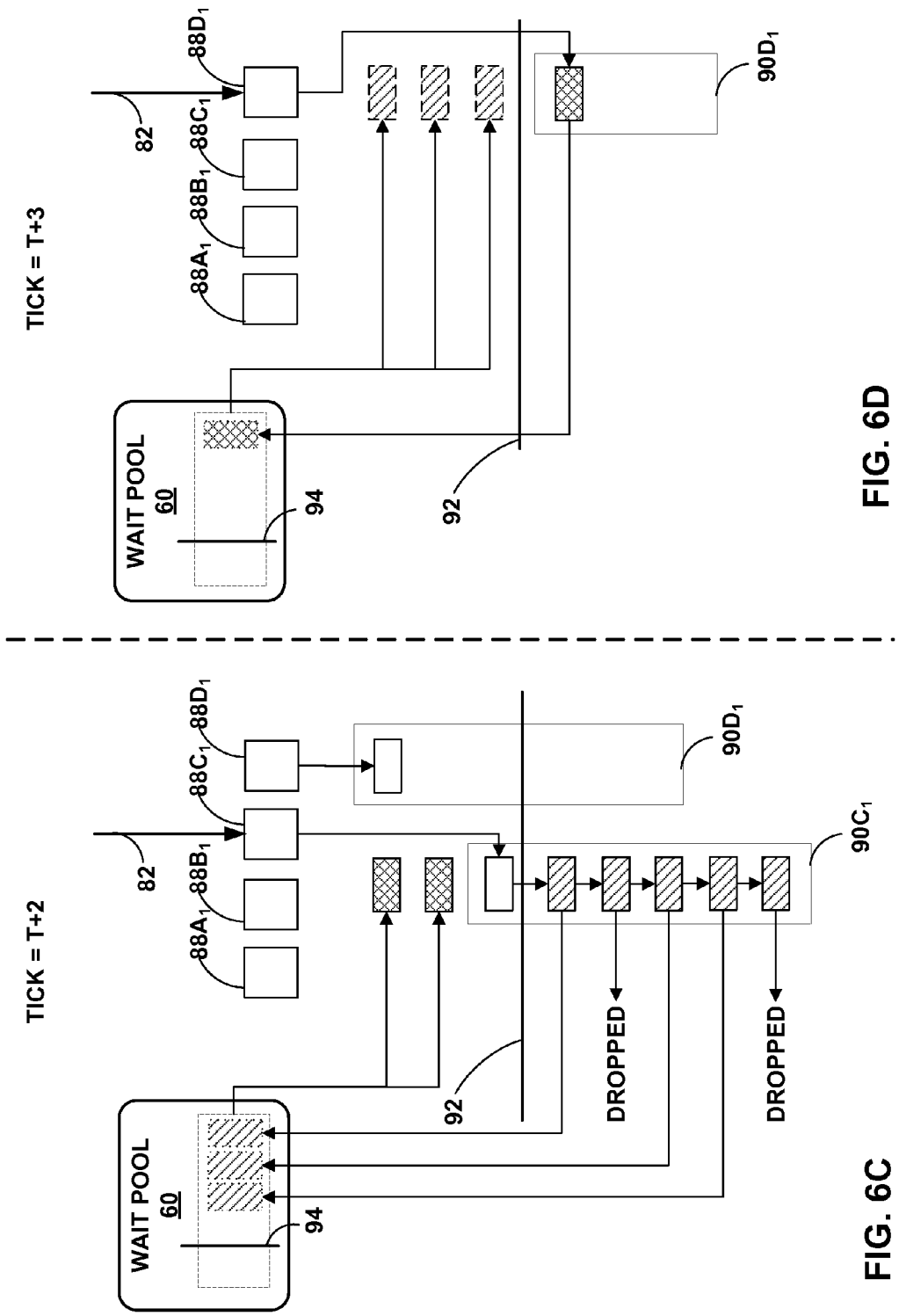

LARGE-SCALE TIMER MANAGEMENT

TECHNICAL FIELD

The invention relates to computer networks and, more specifically, to subscriber accounting in a service provider network.

BACKGROUND

Network service providers establish networks to provide subscribers with access to services, including broadband Internet access, Voice over Internet Protocol (VoIP), video services, mobile phone service, and others. In a common deployment, hundreds or thousands of individual subscriber devices may connect to a network switch, e.g., a digital subscriber line access multiplexer (DSLAM), that aggregates network traffic from the subscriber devices onto a high-capacity uplink to a provider edge device of the service provider network. The provider edge device may service multiple such network switches located within the service provider's customer service area so as to service million of subscriber devices.

Service providers often measure network traffic exchanged between the service provider network and the subscriber devices, and may collect network traffic statistics for the different services used by each subscriber device. For example, a service provider may periodically collect network traffic statistics for individual subscribers on a per-service basis for a variety of purposes, including subscriber billing, traffic planning, and network load assessment. Because provider edge devices function as an access point for multiple network switches and are typically the first network hop from a subscriber device to a service node, each of the provider edge devices present may be tasked with the requirement of gathering statistics for the services provided to its subscriber devices. However, as the number of subscribers and the number of services offered to the subscribers escalates, service statistics collection requirements may present tremendous resource demands on the provider edge devices.

SUMMARY

In general, techniques are described for managing timers for large-scale service statistics collection within a network device. The techniques can readily be applied in large networks that may have millions of concurrent packet flows. Moreover, techniques are described in which a network device implements a rate-limiting mechanism that, in conjunction with a timer wait pool, provides a quantifiable service rate for service statistics collection.

In one example implementation, a deterministic timer manager executing on the network device implements a hashed timing wheel data structure that defines a plurality of slots, with each slot able to store a number of upcoming timer events. The timing wheel data structure is defined to represent a span of time, where the slots represent sequential time intervals. When statistics are to be collected for a new packet flow associated with a service, the timer manager inserts a new timer into the timing wheel at a slot that both has available space and most nearly approximates the correct slot for the timer. The timer manager advances the timing wheel to a next slot once in accordance with a tick interval and, upon advancement, services a number of timers held by the slot up to a prescribed rate limit value. If the number of timers held by the slot exceeds the rate limit value, the timer manager defers any unserviced excessive timers for the current time slot to a wait pool that stores timers for future processing in a subsequent slot. Deferring timers in excess of the wait pool capacity triggers a drop mechanism that selects and drops timers from the wait pool.

In one embodiment, the invention is directed to a method that comprises the step of storing, within a network device, a timing wheel data structure defining a plurality of slots, wherein the timing wheel data structure represents a span of time and the slots represent sequential time intervals. The method further comprises the step of, during a first one of the time intervals, servicing up to a rate limit value of a plurality of timer events stored in a first one of the slots, wherein the rate limit value is less than a total number of the plurality of timer events stored in the first one of the time slots. The method additionally comprises the step of deferring at least one of the unserviced timer events from the first one of the slots to a second one of the slots that corresponds to a second one of the time intervals. The method further comprises the step of, during the second time interval, servicing at least one of the timer events deferred from the first one of the slots.

In another embodiment, the invention is directed to a network device comprising a processor and a memory storing a timing wheel data structure defining a plurality of slots, wherein the timing wheel data structure represents a span of time and the slots represent sequential time intervals. The network device additionally comprises a rate limiter executing on the processor to select up to a rate limit value of a plurality of timer events stored in a first one of the slots, wherein the rate limit value is less than a total number of the plurality of timer events stored in the first one of the time slots. The network device further comprises a timer service module to service the selected timer events during the first time interval, wherein the timer service module defers at least one of the unserviced timer events from the first one of the slots to a second one of the slots that corresponds to a second one of the time intervals, and wherein the timer service module, during the second time interval, services at least one of the timer events deferred from the first one of the slots.

In another embodiment, the invention is directed to a computer-readable medium containing instructions. The instructions cause a programmable processor to store, within a network device, a timing wheel data structure defining a plurality of slots, wherein the timing wheel data structure represents a span of time and the slots represent sequential time intervals. The instructions further cause the programmable processor to, during a first one of the time intervals, service up to a rate limit value of a plurality of timer events stored in a first one of the slots, wherein the rate limit value is less than a total number of the plurality of timer events stored in the first one of the time slots. The instructions further cause the programmable processor to defer at least one of the unserviced timer events from the first one of the slots to a second one of the slots that corresponds to a second one of the time intervals. The instructions further cause the programmable processor to, during the second time interval, service at least one of the timer events deferred from the first one of the slots.

The techniques herein described may present one or more advantages. For instance, by applying a rate limiting mechanism to timer event servicing, the techniques may enable a system to provide a quantifiable service rate, deferral rate, and drop rate for timer event processing. In addition, applying a drop mechanism may enable servicing of an average timer event arrival rate that exceeds the guaranteed service rate.

The details of one or more embodiments of the invention are set forth in the accompanying drawings and the descrip-

BRIEF DESCRIPTION OF DRAWINGS

FIGS. 6A-6D are block diagrams that illustrate deferral and dropping of timer events over a series of timer ticks, by the deterministic timer manager of FIG. 3, according the techniques described.

DETAILED DESCRIPTION

Figure 1:
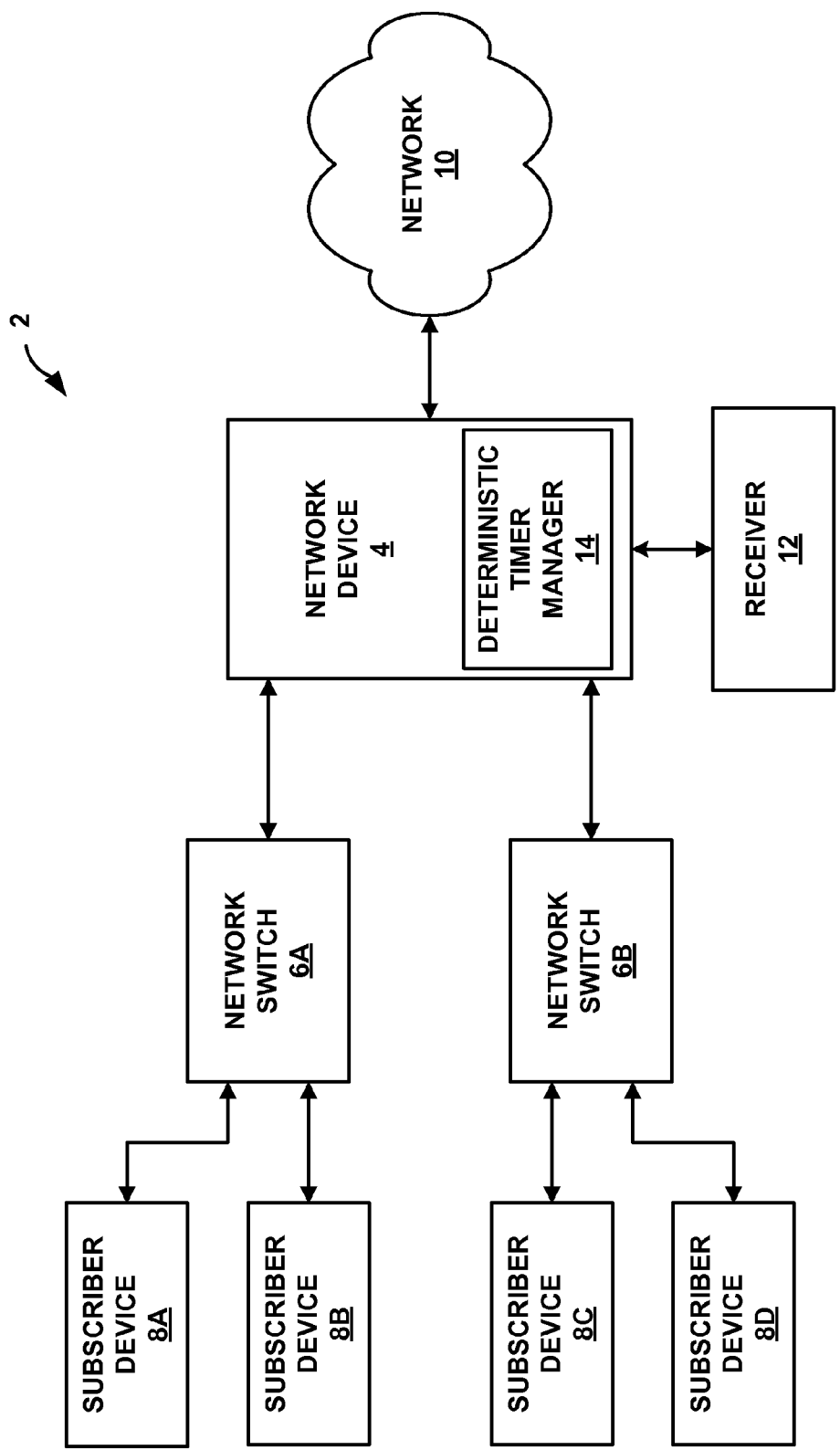
FIG. 1 is a block diagram illustrating a system in which a network device performs large scale timer management according to the described techniques.

FIG. 1 is a block diagram illustrating an exemplary system 2 in which a network device 4 provides subscriber devices 8A-8D ("subscriber devices 8") with connectivity to a network 10. Subscriber devices 8 may connect to network device 4 via intermediate network switches 6A and 6B ("network switches 6").

Network 10 represents any computer network and may have a variety of networked resources capable of data communication. For example, network 10 may include routers, hubs, gateways, servers, workstations, network printers and faxes or other devices. Network 10 may comprise an Internet Protocol (IP) network that includes both an IP version four (IPv4) portion and an IP version six (IPv6) portion. Moreover, network 10 may represent the Internet or any public or private network.

Subscriber devices 8 represent any customer-side access device, such as a cable modem, digital subscriber line (DSL) modem, wireless access point, gateway or other device that provides connectivity to client-side devices, such as personal computers, laptops, workstations, personal digital assistants (PDAs), wireless devices, network-ready appliances, file servers, print servers or other devices. In some cases, subscriber devices 8 may be included within one or more customer networks. For example, subscriber devices 8A and 8B may be included in one customer network, and subscriber devices 8C and 8D may be included in another customer network. Customer networks represent networks established by individuals or companies for internal communication and may include local area networks (LANs) or wide area networks (WANs) that comprise a plurality of subscriber devices. In some embodiments, customer networks may be customer-specific networks that use the Asynchronous Transfer Mode (ATM) protocol to communicate information in fixed or variable-sized units referred to as frames. Other embodiments may use other layer two protocols, and the techniques should not be understood to be limited to ATM.

In the illustrated example, subscriber devices 8A and 8B connect to network device 4 via network switch 6A, and subscriber devices 8C and 8D connect to network device 4 via network switch 6B. In other embodiments, any number of network switches 6 may connect to network device 4 and any number of subscriber devices 8 may connect to each of network switches 6. In one embodiment, network switches 6 may comprise digital subscriber line access multiplexers (DSLAMs) or other switch devices. Each of subscriber devices 8 may utilize a Point-to-Point Protocol (PPP), such as PPP over ATM or PPP over Ethernet (PPPoE), to communicate with network device 4.

Each of network switches 6 may communicate with network device 4 over a physical interface supporting various protocols, e.g., an ATM interface supporting ATM protocols. Network device 4 serves as an aggregation point for subscriber traffic and provides session termination and subscriber management functions, including authentication, authorization, and accounting (AAA). Network device 4 may include Broadband Remote Access Server (BRAS) functionality to aggregate subscriber traffic from switches 6 into a higher-speed uplink to network 10. In some embodiments, network device 4 may comprise a router that maintains routing information between subscriber devices 8 and network 10.

Network device 4 performs certain subscriber management functions according to a schedule specified by a set of one or more timer events that, upon expiry, direct network device 4 to, for example, collect data for a session between one of subscriber devices 8 and service application, re-authenticate a subscriber, re-authorize a subscriber for a particular service, or perform some other function. Exemplary system 2 includes receiver 12 to perform AAA service functionality for network device 4. For example, receive 12 may receive and store accounting information, including session data, from network device 4; may authenticate subscribers when requested; and may authorize subscribers for a particular service when requested.

In accordance with the techniques of this disclosure, network device 4 comprises deterministic timer manager 14 to receive, manage, and notify network device 4 of the timer events that direct network device 4 to perform subscriber management functions. Moreover, deterministic timer manager 14 employs a rate limiting mechanism to provide a quantifiable service rate for timer event processing. As described herein, deterministic timer manager 14 may implement a timing wheel data structure (herein, "timing wheel") that defines a plurality of slots. The timing wheel is defined to represent a span of time, where the slots represent sequential time intervals. Each slot is able to store a number of upcoming timer events due to trigger, e.g., expire, in the time interval for the slot to which the timer events are assigned. In operation, deterministic timer manager 14 services any timer events associated with a current one of the slots of the timing wheel. For example, the timer events for the current slot of the timing wheel may cause network device 4 to take some action (e.g., collect traffic statistics) for particular communication sessions from subscriber devices 8. Depending on current traffic load conditions, the rate limiting mechanism may cause deterministic timer manager 14 to defer processing of some expired timer events to a future time when the number of expired timer events exceeds a defined threshold for a given time slot. Moreover, any deferred processing of timer events may be associated with future time slots based on a determined capacity of those future time slots. As a result, deterministic timer manager 14 may operate to receive and process an average number of timer events each interval (e.g., second) that correlates to the number of subscriber service sessions. Because both the arrival rate of timer events (i.e., the rate of timers to be currently serviced) and the timer event capacity of the deterministic timer manager 14 are quantifiable, the deferral rate caused by the rate limiting mechanism is similarly quantifiable.

In some instances, deterministic timer manager 14 may additionally employ a dropping mechanism to attenuate the effect of timer bursts on system volatility caused by, for example, bursty timer event arrivals and intermittent memory shortages due to bursts in new communication sessions associated with subscriber devices 8. The number of timer events that deterministic timer manager 14 drops is deterministic and, therefore, similarly quantifiable.

By providing a quantifiable service rate for timer event processing, deterministic timer manager 14 may avoid a non-deterministic service rate that is dependent upon resource availability and enable network device 4 to provide a guaranteed timer event service rate to a service provider that operates network 10.

Figure 2:
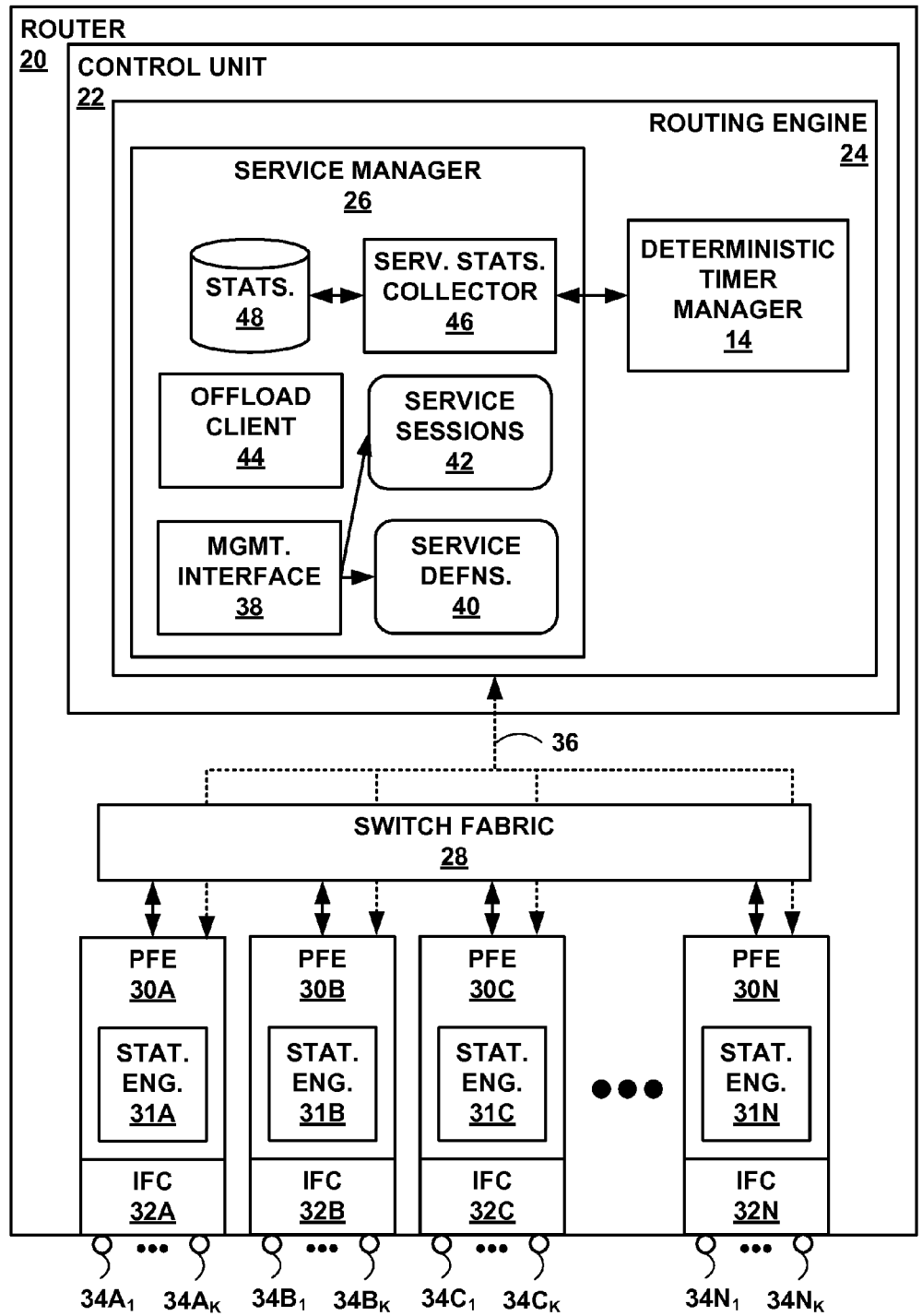
FIG. 2 is a block diagram illustrating a router that includes a deterministic timer manager to perform large scale timer management for service statistics collection in the manner described herein.

FIG. 2 is a block diagram illustrating router 20, which may be an exemplary embodiment of network device 4 of FIG. 1. In some embodiments, router 20 is a provider edge router that comprises a BRAS or a Broadband Services Router (BSR). Although described below with respect to a particular network device, i.e., router 20, the techniques of this disclosure are applicable to other network devices that manage timer events. Router 20 comprises control unit 22 that provides an operating platform for routing engine 24. Control unit 22 may comprise a memory device and a programmable processor (not shown) that executes software instructions in the form of, for example, a computer program or code library stored by the memory device.

Router 20 further comprises a set of interface cards 32A-32B ("IFCs 32") that each include a set of K interfaces (collectively, "interfaces 34") for exchanging packets with other network devices. For example, interface card 32A includes interfaces $34A_1$-$34A_K$. Each of IFCs 32 is associated with a respective one of packet forwarding engines 30A-30N ("PFEs 30"). Router 20 additionally comprises switch fabric 28 that may interconnect PFEs 30 in a full mesh topology such that each of PFEs 30 may be directly connected, via switch fabric 28, to any other one of PFEs 30. When router 20 receives a packet at one of IFCs 32, the associated one of PFEs 30 determines a destination and associated next hop for the packet based on forwarding information received from routing engine 24 and outputs the packet on the one of IFCs 52 that includes the next hop interface from among interfaces 34.

IFCs 32 exchange subscriber traffic for one or more subscriber service sessions with other network devices. PFEs 30 each comprise a respective one of statistics engines 31A-31D ("stat. eng. 31A-31D") to monitor subscriber traffic flows and collect subscriber traffic flow statistics on a per service basis as the subscriber traffic is sent/received by the one of IFCs 32 that is coupled to the subscriber. Statistics engines 31 store the service statistics for upload to routing engine 24.

Routing engine 24 is communicatively coupled to PFEs 30 with communication link 36. Communication link 34 may be a separate shared bus, dedicated cables or lines, a backplane, or other any other connection medium, either wired or wireless. In some instances, communication link connects routing engine 24 to PFEs 30 via switch fabric 28.

Routing engine 24 includes a service manager 26 that, in general, provides authentication, authorization, service selection, and service activation/deactivation to subscribers. Service manager 26 comprises management interface 38 ("mgmt. interface 38") and service definitions 40 ("service defns. 40"). Service definitions 40 comprises one or more service definitions that may each include profiles, policies, and quality of service (QoS) settings that define a scope of a service granted to a subscriber. In this example, each of service definitions 40 also includes a statistics configuration that specifies, for instance, the type of statistics to collect for the associated service and the frequency of collection. For example, a service definition in service definitions 40 may specify periodic collection of a traffic flow volume for any individual communication session for an associated service. Traffic flow volume may refer to a number of bytes or packets for a packet flow associated with the service. In some instances, statistics configurations of service definitions 40 are determined according to bulkstats requirements of customers of a service provider network that includes router 20. Service manager 26 applies service definitions 40 to associated services.

Management interface 38 exposes a set of functions by which a remote management device may configure service definitions 40 and activate/deactivate service sessions. Management interface 38 receives commands as well as configuration and other data from the remote management device and may comprise, for example, a command-line interface (CLI) or a Remote Authentication Dial-In User Service (RADIUS) interface.

Service manager 26 further comprises service sessions 42, which maintains descriptive data for one or more active sessions. When directed by a remote management device via management interface 38, service manager 26 activates, for a given subscriber, a service instance according to one of service definitions 40 and stores the active session in service sessions 42. A subscriber may have multiple active service sessions in service sessions 42. Descriptive data in an active service session of service sessions 42 may include the name of the subscriber or name of the service, the type and IP address of the subscriber's respective IFC 32, the session status, and other values. Descriptive data also includes the statistics configuration of an active session, which may comprise the type of statistics collected and the frequency for collecting such statistics. In this example a statistics configuration of an active session is determined by a respective one of service definitions 40 for the session.

To perform various aspects of service statistics management, service manager 26 additionally comprises offload client 44, service statistics collector 46 ("serv. stats. collector 46"), and statistics data 48 ("stats. 48"). Service statistics collector 46 obtains statistics for active service sessions in service sessions 42 according to the respective statistics configurations in active service session. For instance, an active service session in service sessions 42 may require collection of a traffic flow volume for an associated service every 15 minutes. Service manager 26 may manage a large number of subscribers and services for the subscribers. For efficient run-time operation that avoids busy-waiting, service statistics collector 46 instantiates timer events to outsource timekeeping for service statistics collection for individual communication sessions on a per-subscriber and possibly a per-service basis. Service statistics collector 46 differentiates the timer events according to statistics configurations for service sessions 42. Upon expiry and processing, a timer event directs service statistics collector 46 to obtain, for the associated one of service sessions 42, statistics from the one of statistics engines 31 on the associated service session subscriber's respective IFC 32.

For example, service statistics collector 46 may instantiate a timer event that expires every 15 minutes and associate that timer event with a packet flow for an active service session of a subscriber device 8 that communicates through IFC 32B via one of interfaces 34B. When the timer event expires, the timer event directs service statistics collector 46 to obtain statistics for the active service session from statistics engine 31B. In various embodiments, service statistics collector 46 may obtain traffic flow volume statistics for a service session, per network interface statistics (including bytes/packets that traverse the interface, bytes/packets forwarded, bytes/packets dropped, and ingress packets errored), and/or per layer 2 interface statistics (including bytes/cells/frames that traverse the interface, bytes/cells/frames discarded, ingress cells/frames errored), or other statistics.

In some embodiments, service statistics collector 46 associates instantiated timer events with filter criteria entries of a filter table that stores packet flow capture information in order to target specific communications. Upon expiry, a timer event may indicate that an associated filter criteria entry expires and that service statistics collector 46 should remove the entry from the filter table, refresh the entry, or perform some other action with respect to the entry. In this manner, the techniques allow for large scale timer management for timer events used when monitoring a high volume of packet flows, while, in some instances, requiring only minimal use of the operating system for managing the timeouts. Further details regarding the use of circular buffers that define a plurality of slots (i.e., timing wheels) for monitoring filter criteria entries of a filter table are found in U.S. Pat. No. 7,633,944, the entire contents of which are incorporated herein.

Service statistics collector 46 stores collected statistics to statistics data 48 in one or more data structures, such as tables, linked lists, trees, flat files or other structures, to store and manage service statistics data for router 20. Statistics data 48 comprises one or more computer-readable storage media, which may include random-access memory (RAM) such as various forms of dynamic RAM (DRAM), e.g., DDR2 SDRAM, or static RAM (SRAM), flash memory, hard disks, compact discs, or any other form of fixed or removable storage medium that can be used to carry or store program data in the form of data structures and that can be accessed by a computer.

Offload client 44 reads collected statistics from statistics data 48 and sends the statistics to a server, such as a AAA server, to enable accounting and billing of subscribers for service sessions managed by service manager 26. Offload client 44 may be, for example, a RADIUS client or an interface that enables access by an administrator or a server to statistics data 48.

In accordance with the techniques of this disclosure, routing engine 24 comprises deterministic timer manager 14 to handle timer events for executing processes. After service statistics collector 46 instantiates a timer event for statistics collection for a service session, service statistics collector 46 sends the timer event to deterministic timer manager 14, which adds the timer event to a slot of a timer data structure having a plurality of slots. Deterministic timer manager 14 periodically advances the timer data structure, which causes any timer event at the advanced-to slot to expire.

According to the described techniques, and as described in detail below with respect to FIG. 3, deterministic timer manager 14 applies a rate limiting mechanism to expired timer events in the advanced-to slot to defer processing of any expired timer events that exceed a threshold number to a future slot in the timer data structure. Deterministic timer manager 14 returns a threshold number of expired timer events to service statistics collector 46, which processes the received, expired timer events to obtain service statistics from statistics engines 31 for those service sessions 42 associated with the received timer events. Service statistics collector 46 stores newly obtained service statistics in statistics data 48.

In some instances, deterministic timer manager 14 may additionally employ a dropping mechanism to attenuate the effect of timer bursts on system volatility caused by, for example, bursty timer event arrivals and intermittent memory shortages. In these instances, deterministic timer manager 14 applies the dropping mechanism to drop expired timer events, rather than sending the expired timer events to service statistics collector 46 for processing or deferring the expired timer events to a future slot in the timer data structure. Applying the dropping mechanism may allow deterministic timer manager 14 to provide a deterministic service rate that exceeds an average arrival rate of timer events received from service statistics collector 26.

In some embodiments, some or all functionality of deterministic timer manager 14 are distributed to PFEs 30. In some embodiments, some or all functionality of service manager 26 are distributed to PFEs 30.

By providing a quantifiable service rate for timer event processing, deterministic timer manager 14 may enable service manager 26 and, concomitantly, router 20 to provide a quantifiable service rate for statistics collection to a service provider and/or a service provider network customer. In this example, deterministic timer manager 14 operates to handle timer events for service session statistics collection. In some embodiments, processes executing within control unit 22 of router 20 may use deterministic timer manager 14 to handle timer events for other functions of router 20 that require large scale timer management.

Figure 3:
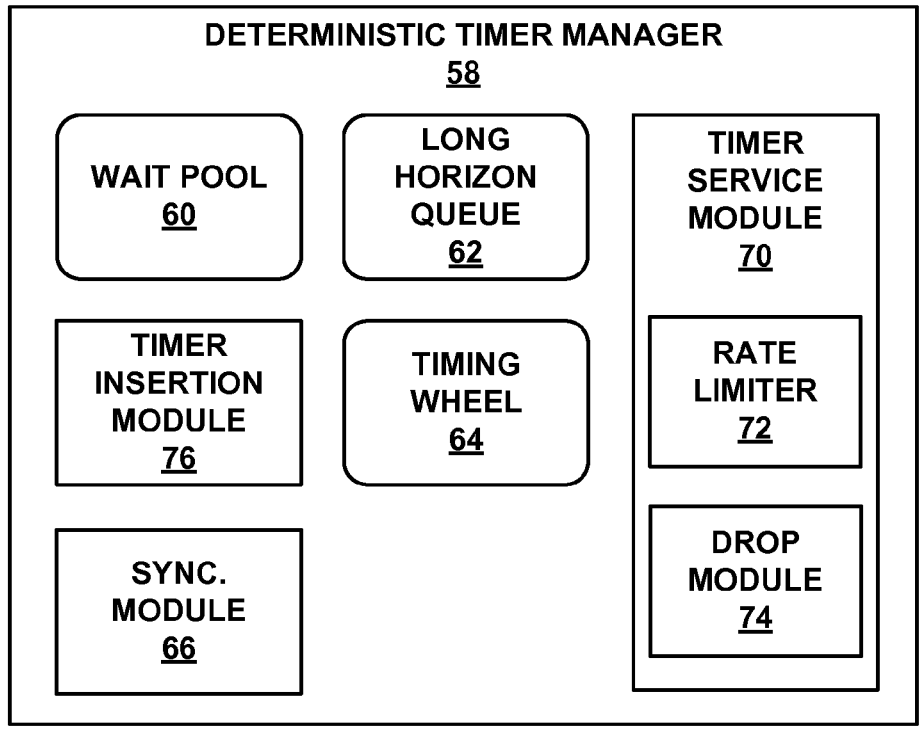
FIG. 3 is a flowchart illustrating the deterministic timer manager of FIG. 2 in greater detail.

FIG. 3 is a block diagram illustrating deterministic timer manager 58, an exemplary embodiment of deterministic timer manager 14, in further detail. Deterministic timer manager 58 may comprise an object having a data structure and methods for manipulating the data structure. The object may comprise instructions executable by a programmable processor and instantiable as an object by service manager 26 or other processes of routing engine 24. In some instances, deterministic timer manager 58 comprises hardware or firmware, such as timers and counters, operating in control unit 22 to provide deterministic timing mechanisms, such as hardware interrupts.

In this example, deterministic timer manager 58 comprises timing wheel 64, timer insertion module 76, and long horizon queue 62. Further, in this example, timing wheel 64 is a timing data structure implemented as a circular buffer that includes a plurality of wheel slots. The timing wheel is defined to represent an overall span of time, where the slots represent sequential time intervals through that span of time. Each slot able to store a number of upcoming timer events that are set to trigger for servicing, e.g., expire, in the time interval for the slot to which the timer events are assigned.

The size of the timing wheel is equal to the number of slots. Each slot is associated with at least one "tick" in time, wherein each tick encompasses a discrete time interval. The "tick interval" maintained by deterministic timer manager 58 determines the speed, or "tick rate," of spinning timing wheel 64, i.e., the rate at which the timer manager is required to process through the timer events associated with the time slots. Timer service module 70 advances through timing wheel 64 one slot every tick interval. For example, a tick interval of one second causes timing wheel 64 to advance to a next slot every one second. The tick rate is the inverse of the tick interval. In the illustrated embodiment, the timing wheel size is a factor of the collection period for statistics data. For example, if the collection periods for each service is a multiple of five minutes (e.g., 5 minutes, 10 minutes, 15 minutes, and so on), then the timing wheel size is set to 5×60×(tickrate). If the tick rate is once per second, then the timing wheel size for this example is 300. Because the collection periods align with the rotation period of the timing wheel in this instance, a timer event may be reinserted to the same slot from which it is retrieved for processing when it expires.

The service rate of timing wheel 64 is the number of timer events processed per tick divided by the tick interval. For example, if the tick interval is one second and the number of events processed per tick is 100, the service rate is 100. If the tick interval is two seconds and the number of events processed per tick is 200, the service rate is also 100. In general, a shorter tick interval offers more stringent time accuracy for deterministic timer manager 58.

The number of timer events that may be processed in a given tick interval (that is, the service rate) is proportional to available processing and other system resources. The number processed per tick interval is inversely proportional to administrative requirements, including the cost to manipulate data structures of deterministic timer management 58 (bookkeeping time) and the cost to service each timer event (callback time).

A wheel rotation time for timing wheel 64 is the time required to rotate timing wheel 64 once. That is, the wheel rotation time is the sum of the time intervals encompassed by the plurality of wheel slots that constitute timing wheel 64. Timing wheel 64 has a horizon, defined as the rotation time multiplied by the number of rotations, or rounds, that each slot of timing wheel 64 carries to schedule timer events within the horizon. For example, timing wheel 64 may have 300 slots that each carry timer events that span up to five rounds and have a tick interval of one second. In this example, the rotation time for timing wheel 64 is 300 seconds, and the horizon is 1500 seconds.

Each slot in timing wheel 64 includes a slot bucket that contains a list of one or more round leaders, where each round leader corresponds to a round of timing wheel 64 and comprises a list of timer events for the corresponding round. In some instances, the list of round leaders is a circular list. The size of the list is equal to the wheel horizon divided by the wheel rotation time. The size of a list of timer events is bounded by a burst size value, which is equivalent for each round leader in timing wheel 64. The total number of timer events in a slot bucket, therefore, is bounded by the burst size value multiplied by the number of rounds carried. Depending on the context, the number of timer events in a slot, as used herein, may refer to the sum total of timer events held by all round leaders of the slot bucket of the slot or may refer only to the number of timer events held by the current (i.e., next to be serviced) round leader.

In one example, timing wheel 64 is implemented as a hashed timing wheel. However, in some instances, timing wheel 64 may be a simple or hierarchical timing wheel. Additional information regarding timing wheels may be found in Varghese and Lauck, "Hashed and Hierarchical Timing Wheels: Efficient Data Structures for Implementing a Timer Facility," 1996, the entire contents of which are incorporated by reference herein.

Timer insertion module 76 receives timer events from service statistics collector 46 for deterministic timer manager 58.

As described above with respect to FIG. 2, service statistics collector 46 may instantiate a timer event and associate that timer event with a packet flow for an active service session of a subscriber device that communicates via one of interfaces 34. When the timer event expires, the timer event directs service statistics collector 46 to obtain statistics for the active service session from the corresponding statistics engine 31 for the interface.

Upon receiving a timer event, timer insertion module 76 adds the timer event to the list of timer events for a round leader of a slot bucket in timing wheel 64. Timer insertion module 76 inserts timer events into the slot bucket of a timing wheel 64 slot that (1) most nearly corresponds to the specified time of the timer event and (2) currently holds fewer than burst size timer events. In embodiments of deterministic timer manager 58 that include a timing wheel 64 with a wheel size that is a factor of the collection period for statistics data, timer insertion module 76 reinserts repeat timers, after processing, to the slot bucket that held the repeat timer prior to processing.

Long horizon queue 62 comprises a queue data structure, having characteristic first-in, first-out (FIFO) functionality, to store timer events that fall outside of the horizon for timing wheel 64. As timing wheel 64 advances, the timing wheel horizon advances further into the future, and timer insertion module 76 checks long horizon queue 62 to determine whether the timer event at the head of long horizon queue 62 is currently within the timing wheel horizon. If so, timer insertion module 76 inserts the timer event to timing wheel 64. Timer insertion module 76 continues analyzing and inserting the timer event at the head of long horizon queue 62 until the timer event at the head falls outside of the horizon for timing wheel 64.

Deterministic timer manager 58 further comprises timer service module 70 and wait pool 60. Timer service module 70 services newly-expired timer events in timing wheel 64. Upon advancing to a next slot, timing wheel 64 sends timer service module 64 the list of timer events in the current round leader for the advanced-to slot bucket. In accordance with the described techniques, timer service module 70 includes rate limiter 72 to cause timer service module 70 to defer expired timer events. Rate limiter 72 comprises a rate limit value that imposes a threshold number of timer events that timer service module 70 may service during any tick interval.

At tick time, timer service module 70 receives the list of timer events for the current round leader for the advanced-to slot bucket. Rate limiter 72 selects up to a number of timer events equal to the rate limit value for processing. Timer service module 70 services those timer events selected for processing. In some embodiments, servicing a timer event includes sending a timer event to another process, thread, or module for processing. In some embodiments, servicing a timer event comprises invoking a callback function associated with the timer event. After timer service module 70 processes a periodic timer event (i.e., a timer event that periodically repeats), timer service module 70 sends the timer event to timer insertion module 76 for reinsertion into timing wheel 64. In some embodiments, servicing a time event comprises resolving a pointer to a filter criteria entry of a filter table and processing the filter criteria entry.

Wait pool 60 stores deferred timer events in a data structure, such as a queue or a list. The capacity of wait pool 60, i.e., the number of timer events that may be stored by wait pool 60, is bounded. In some instances, deterministic timer manager 58 or an administrator may modify the capacity of wait pool 60 correlative to available system memory.

At tick time, timer service module 70 defers received timer events that are not selected for processing by rate limiter 72.

To defer a timer event, timer service module 70 inserts the timer event into wait pool 60. The deferral rate for deterministic timer manager 58 is a function of the arrival rate of timer events and the service rate of the system, e.g., router 20, that employs deterministic timer manager 58.

Timer service module 70 prioritizes, for servicing, timer events stored by wait pool 60 over timer events that timer service module 70 receives in the list of timer events for the current round leader for an advanced-to slot bucket. For example, at tick time, timer service module 70 comprising rate limiter 72 having a rate limit value of ten may receive, from timing wheel 64, a list of seven timer events for the current round leader for the advanced-to slot bucket, while wait pool 60 stores six deferred timer events. Timer service module 70 obtains and services the six deferred timer events from wait pool 60 and additionally services four of the timer events in the received list to reach the rate limit value of ten. Timer service module 70 defers the three excess timer events in the received list to wait pool 60 for servicing during a future time interval that corresponds to a later tick. By prioritizing timer events stored by wait pool 60, timer service module 70 may ensure that timer event deferrals are fairly applied such that a deferred timer is not continually deferred during instances of timing wheel congestion due to, for instance, bursty timer event arrivals. In some embodiments of deterministic timer manager 58, timer service module 70 prioritizes, for service, timer events in a received list of timer events over timer events held by wait pool 60.

Timer service module 70 additionally comprises drop module 74 to drop timer events when a burst size of timer events exceeds a defer threshold. In instances where a required service rate is greater than a sustainable service rate for a device employing deterministic timer manager 58, timer service module 70, being unable to process sufficient numbers of timer events to reduce the number of events held by wait pool 60, may defer timer events to wait pool 60 in excess of a defer threshold. Drop module 74 comprises a defer threshold value. When the number of deferred timer events held by wait pool 60 exceeds the defer threshold value, drop module 74 drops and removes timer events held by wait pool 60 and sends the timer events to timer insertion module 76 for re-insertion into timing wheel 64. In some embodiments, timer insertion module 76 inserts dropped timer events into the respective slot buckets that previously held the dropped timer events. In some embodiments, upon exceeding the defer threshold value, drop module 74 drops a randomly selected half of the timer events held by wait pool 60.

In some embodiments, prior to sending dropped timer events to timer insertion module 76, drop module 74 marks the dropped timer events as dropped. In such embodiments, during a future drop process, drop module 74 does not drop a timer event held by wait pool 60 that is marked as dropped, for that is an indication that timer service module 70 did not service for processing the timer event during the previous expiry of that timer event. Timer service module 70 removes a drop mark of any timer event that it services for processing. In this way, timer service module 70 may enable a service rate that doubles the sustainable service rate of the system, e.g., router 20, that employs deterministic timer manager 58. The drop rate is a function of the deferral rate and the size of wait pool 60.

Deterministic timer manager 58 further comprises synchronization module 66 ("sync. module 66") to synchronize timing wheel 64 with a system time for the system that employs deterministic timer manager 58. At tick time, synchronization module 66 compares the tick time for the advanced-to slot with the system time. If the difference, or skew, between the times is greater than one tick interval, synchronization module 66 may compensate by advancing timing wheel 64 to next slot to cause timer service module 70 to service two contiguous slot buckets in a single tick interval. In some embodiments, synchronization module 66 only compensates for tick skew when sum of the number of timer events in the respective current round leaders of the advanced-to slot bucket and the next slot bucket is fewer than the rate limit value.

By performing the described techniques, deterministic timer manager 58 may provide a deterministic and quantifiable service rate for the system, which permits a service provider that employs the system to provide a guaranteed service rate.

Figure 4:
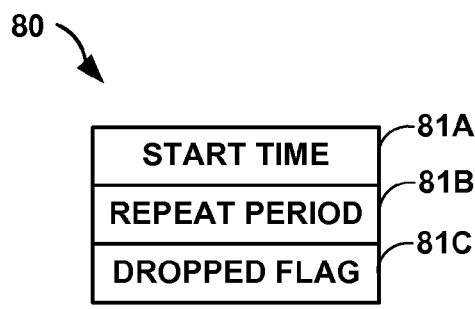
FIG. 4 is a block diagram illustrating elements of a timer event data structure generated according to the described techniques.

FIG. 4 is a block diagram illustrating an exemplary data structure for a timer event 80 that accords with the described techniques. In this example, timer event 80 comprises three values, start time 81A, repeat time 81B, and dropped flag 81C. The value of start time 81A is an expiration time for timer event 80. The value of repeat time 81B specifies a period of timer event 80. That is, timer event 80 expires once every period. If the value of repeat time 81B is zero, timer event 80 is not periodic. Dropped flag 81C is a Boolean value that, when true, indicates that drop module 74 dropped timer event 80 after the previous expiry of timer event 80. In some embodiments, timer event 80 comprises additional values, such as a reference to a calling class (e.g., a component of service manager 26), a pointer to a callback function that performs statistics collection for a service associated timer event 80 at expiry and servicing, and/or a pointer to a filter criteria entry in a filter table.

Figure 5:
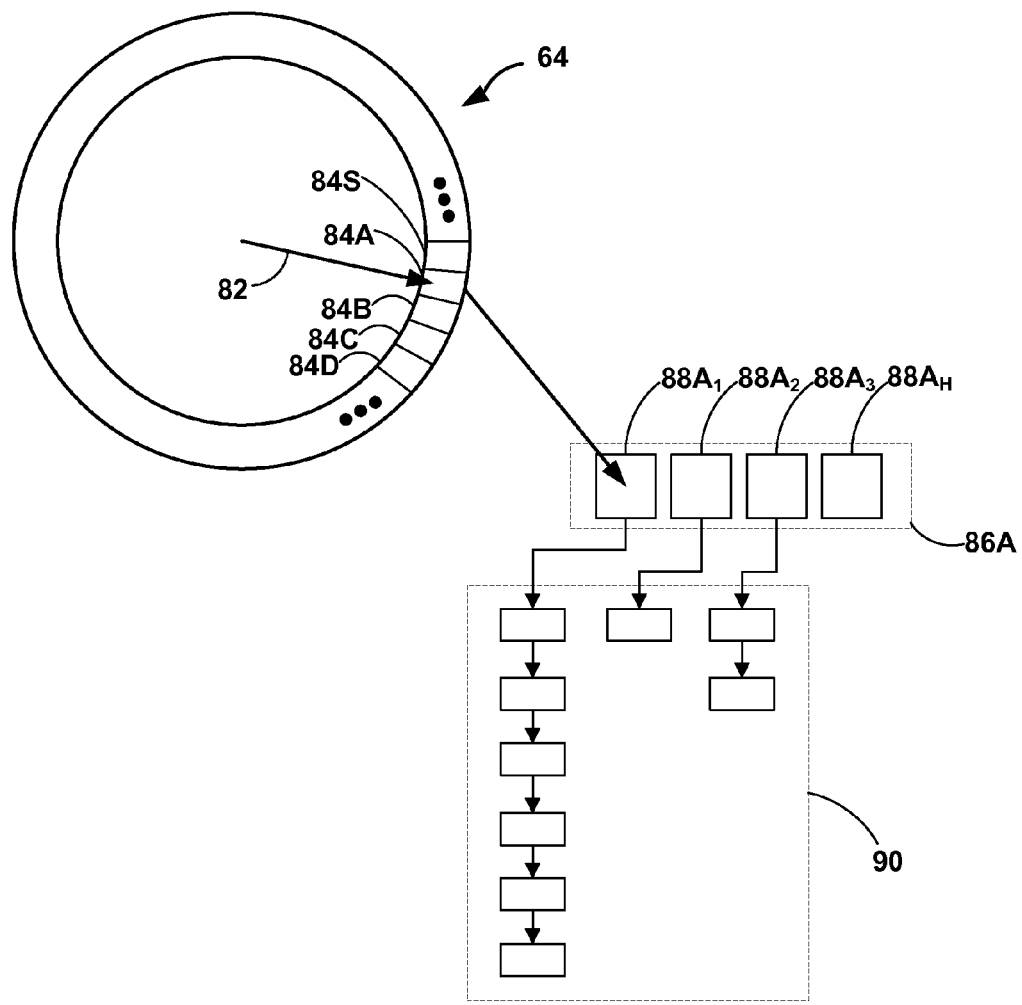
FIG. 5 is a block diagram illustrating elements of a timing wheel data structure of the deterministic timer manager of FIG. 4.

FIG. 5 is a block diagram illustrating timing wheel 64 of FIG. 3 in further detail. Timing wheel 64 comprises slots 84A-84S ("slots 84") and current slot pointer 82, which indicates the one of slots 84 currently being serviced. Current slot pointer 82 may include a pointer that resolves one of slots 84, an index value for an array, or another value. In the illustrated embodiment, current slot pointer 82 indicates that slot 84A is currently being serviced. The size of timing wheel 64 is equal to the number of slots 84.

Hereinafter, description of each of slots 84 is made with respect to slot 84A. Slot 84A includes a slot bucket 86A that maintains a set of round leaders $88A_1$-$88A_H$ ("round leaders 88A"). Round leaders 88A is a circular list of H round leaders that each stores up to a burst size number of timer events 90 inserted into slot bucket 86A by timer insertion module 76. Each of round leaders 88A is associated with an upcoming rotation, or "round," of timing wheel 64. In this instance, round leader $88A_1$ stores six of timer events 90 set to expire during the current round; round leader $88A_2$ stores one of timer events 90 set to expire during the next round, and so on.

FIGS. 6A-6D ("FIG. 6") are block diagrams illustrating deferral and dropping of timer events 90, over a series of timer ticks, by timer service module 70 to future slots 84. Each of FIG. 6 illustrates selected components of timing wheel 64 of FIG. 5, including wait pool 60, current slot pointer 82, and round leaders $88A_1$, $88B_1$, $88C_1$, and $88D_1$. As described with respect to FIG. 5, round leader $88A_1$ is maintained by slot bucket 86A, while round leader $88B_1$ is maintained by slot bucket 86B, and so on. The illustrated round leaders, therefore, stores a successive series of timer events 90 set to expire as current slot pointer 82 advances to respective round leaders $88A_1$, $88B_1$, $88C_1$, and $88D_1$. For example, timer events $90A_1$ stored by round leader $88A_1$ are set to expire at tick T, a tick time illustrated by FIG. 6A. Timer events $90B_1$ stored by round leader $88B_1$ are set to expire at tick T+1, a tick time illustrated by FIG. 6B, and so on. FIG. 6 further illustrate rate limiter value 92 and defer threshold value 94, which specify a limit to the number of timer events 90 that can be processed and deferred, respectively.

Figure 6B:
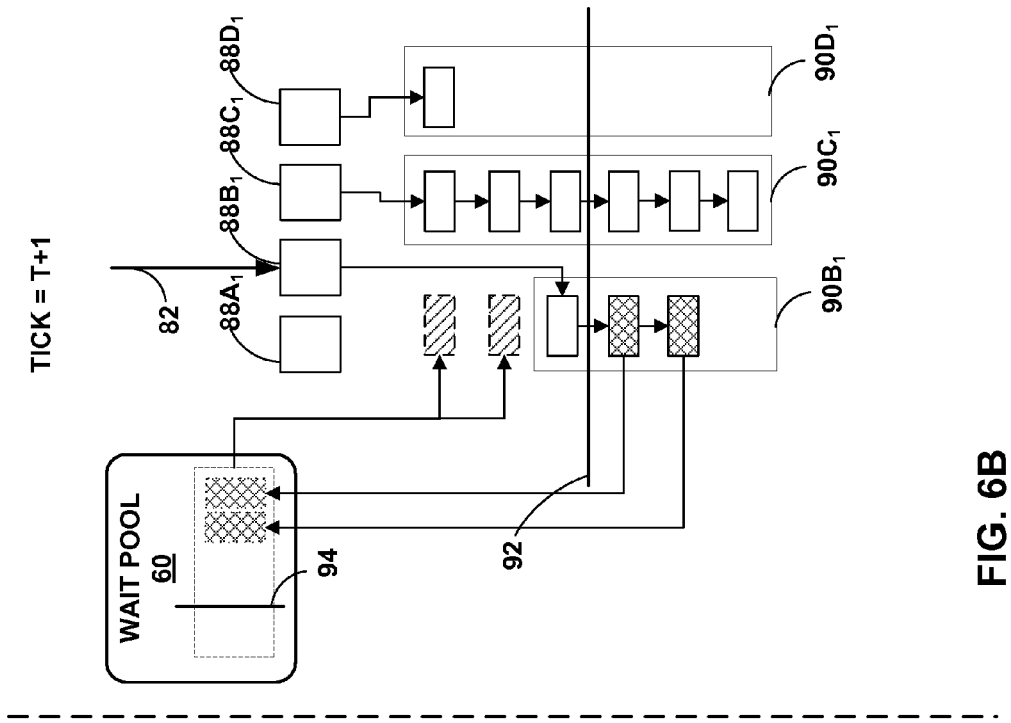
Figure 6A:
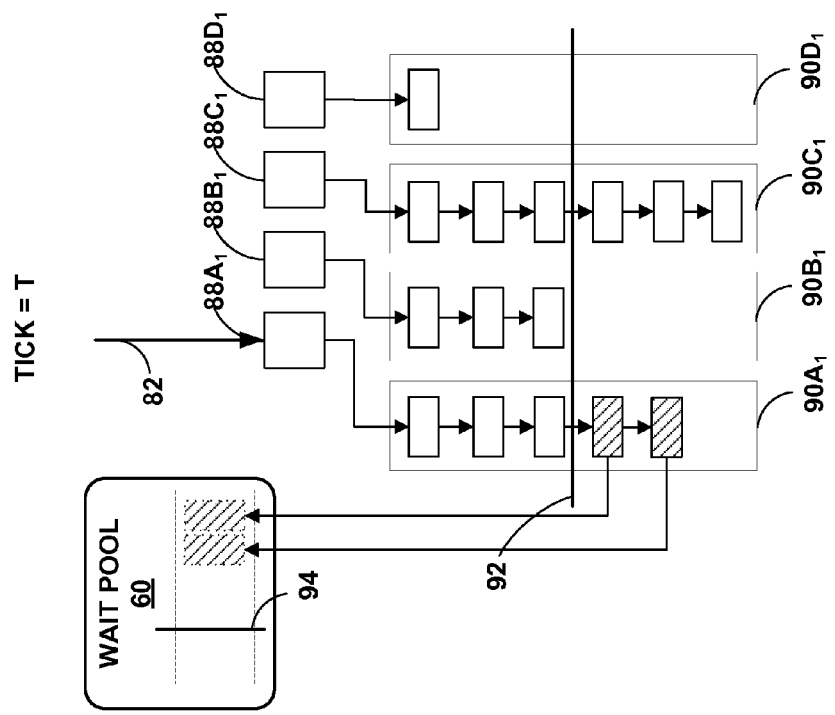

FIG. 6A illustrates timer service module 70 operations on timing wheel 64 during a first tick T. Current slot pointer 82 advanced to slot bucket 88A at tick T, causing timing wheel 64 to send the list of five timer events $90A_1$ to timer service module 70. Wait pool 60 being empty, rate limiter 72 selects up to a number of timer events equal to the rate limit value 92 (in this instance, three) for processing. Timer service module 70 services those timer events $90A_1$ selected for processing, which may include sending the selected timer events $90A_1$ to service statistics collector 46. Timer service module 70 defers, to wait pool 60, the two timer events $90A_1$ not selected for processing (illustrated as hashed ones of timer events $90A_1$). At the end of the tick interval of tick T, wait pool 60 includes the two deferred timer events $90A_1$.

FIG. 6B illustrates timer service module 70 operations on timing wheel 64 during a next tick T+1. Current slot pointer 82 advanced to slot bucket 88B at tick T+1, causing timing wheel 64 to send the list of three timer events $90B_1$ to timer service module 70. Timer service module 70 prioritizes and thus selects, for servicing, the two deferred timer events $90A_1$ held by wait pool 60. Rate limiter 72 selects one timer event $90B_1$ to bring the number of selected timer events 90 up to rate limit value 92. Timer service module 70 then services the three selected timer events, including two deferred timer events $90A_1$ and one timer event $90B_1$. In addition, timer service module 70 defers the two unselected timer events $90B_1$ (illustrated as crisscrossed ones of timer events $90B_1$). At the end of the tick interval of tick T+1, wait pool 60 includes the two deferred timer events $90B_1$.

FIG. 6C illustrates timer service module 70 operations on timing wheel 64 during a next tick T+2. Current slot pointer 82 advanced to slot bucket 88C at tick T+2, causing timing wheel 64 to send the list of six timer events $90C_1$ to timer service module 70. Timer service module 70 prioritizes and thus selects, for servicing, the two deferred timer events $90B_1$ held by wait pool 60. Rate limiter 72 selects one timer event $90C_1$ to bring the number of selected timer events 90 up to rate limit value 92. Timer service module 70 then services the three selected timer events, including two deferred timer events $90B_1$ and one timer event $90C_1$. Timer service module 70 defers, to wait pool 60, the five timer events $90C_1$ not selected for processing (illustrated as hashed ones of $90C_1$). After deferral, wait pool 60 stores five timer events $90C_1$. Drop module 74 determines that the number of timer events 90 held by wait pool 50 exceeds defer threshold value 94 (in this instance, a value of four) and institutes a random drop. In this embodiment, drop module 74 drops two of timer events $90C_1$. Drop module 74 sends the dropped timer events 90 to timer insertion module 76 for reinsertion into timing wheel 64. Timer insertion module 76 may insert the dropped timer events $90C_1$ to round $88C_2$ of slot bucket 86C. At the end of the tick interval of tick T+2, wait pool 60 includes three timer events $90C_1$.

FIG. 6D illustrates timer service module 70 operations on timing wheel 64 during a next tick T+3. Current slot pointer 82 advanced to slot bucket 88D at tick T+3, causing timing wheel 64 to send the list of one timer event $90D_1$ to timer service module 70. Timer service module 70 prioritizes and thus selects, for servicing, the three deferred timer events $90C_1$ held by wait pool 60. Rate limiter 72 determines that the three deferred timer events $90C_1$ meet rate limit value 92. Timer service module 70 then services the selected three deferred timer events $90C_1$ and defers unselected timer event $90D_1$ to wait pool 60. At the end of the tick interval of tick T+3, wait pool 60 includes one deferred timer event $90D_1$.

As FIG. 6 illustrate, performing the rate limiting techniques described herein may allow timer service module 70 to provide a quantifiable rate of service to a device that employs deterministic timer manager 58.

Figure 7:
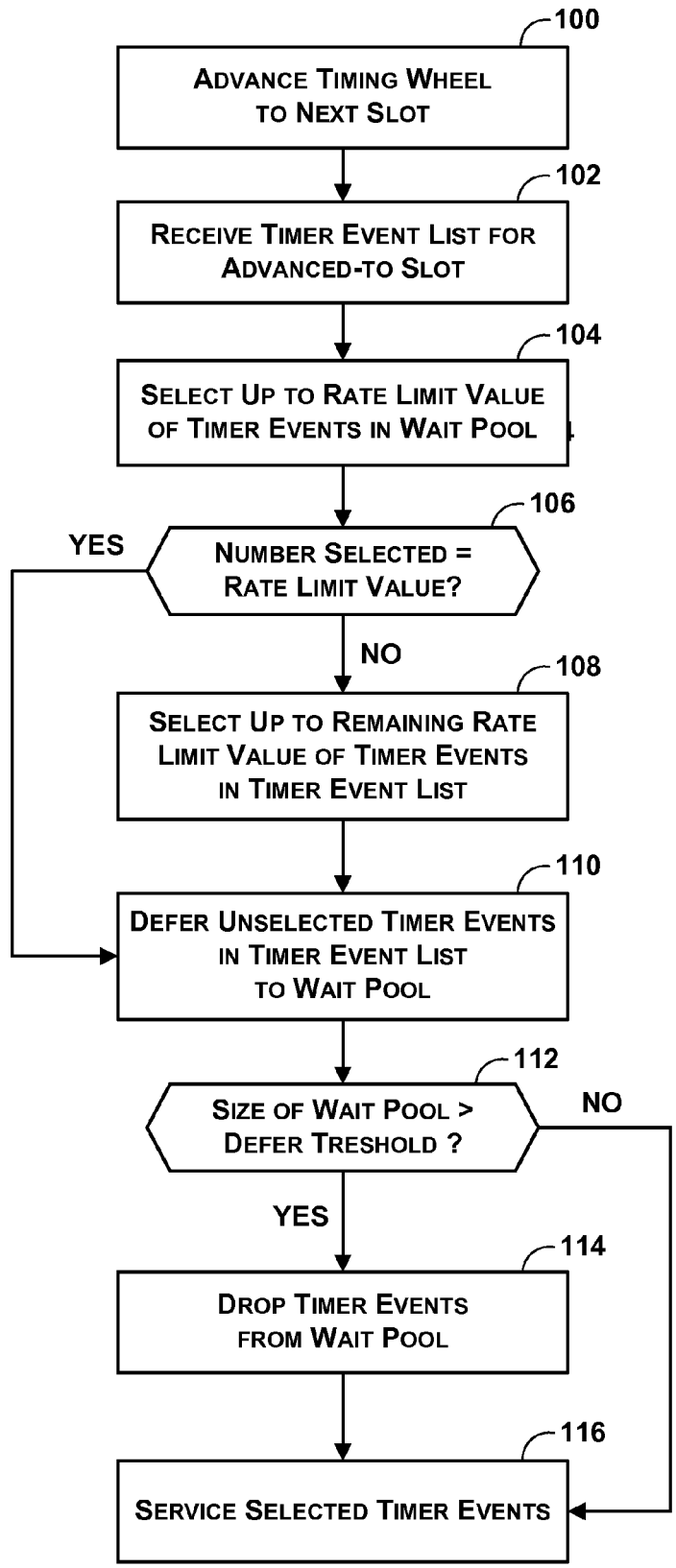
FIG. 7 is a flowchart illustrating an exemplary mode of operation of deterministic timer manager to perform rate limiting and timer event dropping in accordance with the described techniques.

FIG. 7 is a flowchart illustrating an exemplary mode of operation of deterministic timer manager 58 to perform rate limiting and timer event dropping in accordance with the described techniques. After every tick interval, timing wheel 64 advances to the next slot in the timing wheel (100). Timer service module 70 receives, from timing wheel 64, the list of timer events held by the current round leader of the advanced-to slot (102). Timer service module 70 applies rate limiter 72 to timer events currently held by wait pool 60 to select up to a rate limit value of timer events (104). If the number selected is equal to the rate limit value (YES branch of 106), wait pool 60 stores a sufficient number of timer events for servicing by timer service module 70. If, however, the rate limit value is not reached by the number of timer events stored by wait pool 60 (NO branch of 106), timer service module 70 applies rate limiter 72 to the received list of timer events for the advanced-to slot to select a of timer events up to the rate limit value (108). That is, timer events stored by wait pool 60 have service priority, but when wait pool 60 stores fewer than rate limit value timer events, timer service module 70 applies rate limiter 72 to select additional timer events in the received list of timer events to attempt to make up any difference.

Unselected timer events in wait pool 60 remain in the wait pool. Timer service module 70 defers unselected timer events in the received list of timer events to wait pool 60 for servicing at a future timing wheel tick (110). Upon deferral, drop module 74 determines whether the size of wait pool 60 exceeds a specified defer threshold value (112). If so (YES branch of 112), drop module 74 institutes a random drop to cull timer events from wait pool 60 (114). Drop module 74 may pass dropped timer events to timer insertion module 76 for reinsertion into timing wheel 64. Timer service module 70 services the timer events selected from wait pool 60 or the list of received timer events for the advanced-to slot (114).

By performing the above-described operation, deterministic timer manager 58 may provide a quantifiable service rate to a system that employs deterministic timer manager 58, e.g., router 20. Deterministic timer manager 58 may further provide quantifiable deferral and drop rates, and enable the system to service timer events at up to twice the arrival rate.

Figure 8:
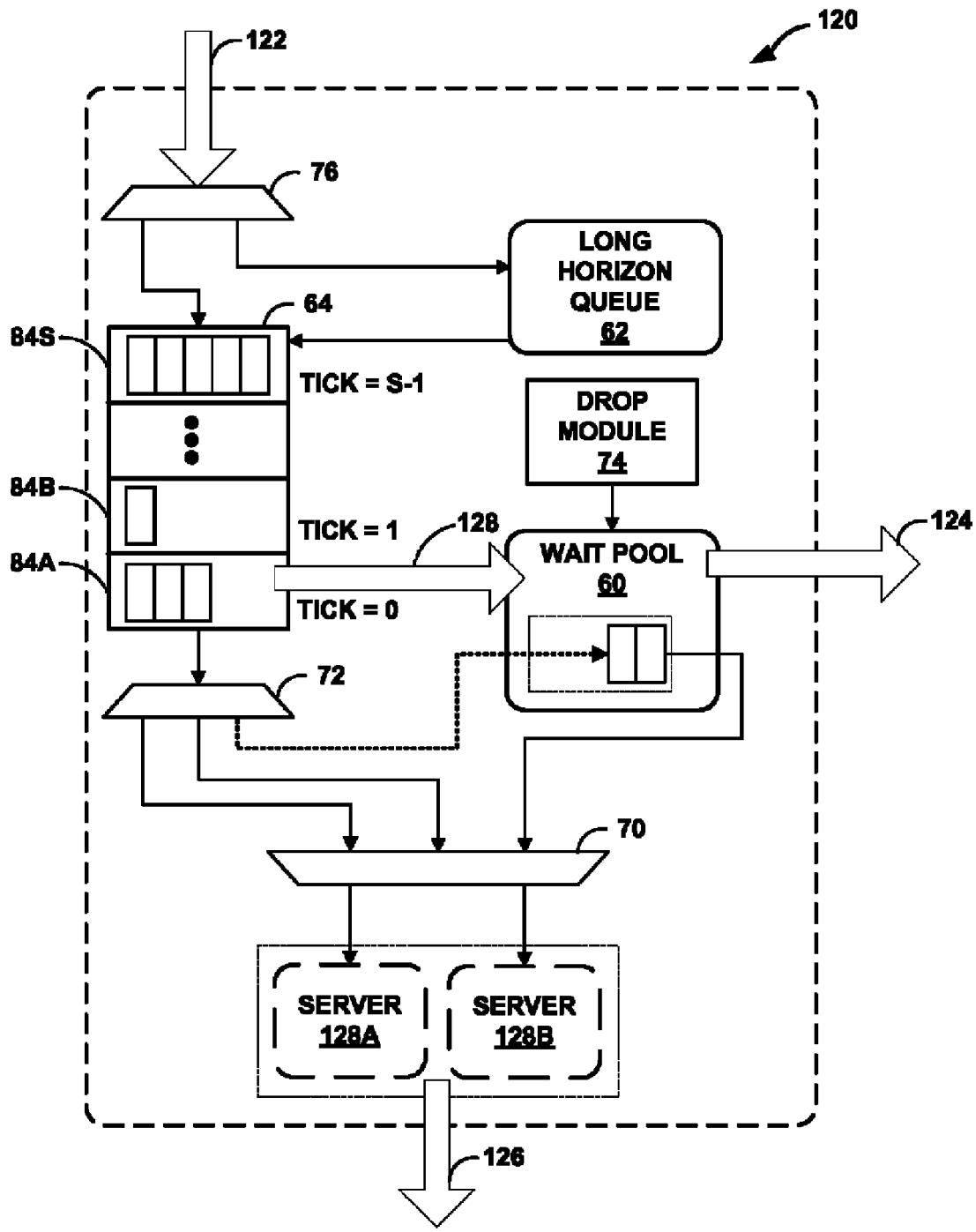
FIG. 8 is a block diagram that illustrates an exemplary, simplified queuing system that models the deterministic timer manager of FIG. 3.

FIG. 8 illustrates deterministic timer manager 58 modeled as a simplified queuing system 120 comprising a limited number of servers 128A-128B ("servers 128"). Servers 128 represent a processing capability of a system that employs deterministic timer manager 58. The number of servers 128 determines a service rate 126 of queuing system 120 and thus of deterministic timer manager 58.

Queuing system 120 comprises timing wheel 64 comprising slots 84A-84S that each maintain a list of timer events due to expire at a respective tick time. Queuing system 120 further comprises wait pool 60 and long horizon queue 62 to store deferred timer events and timer events that exceed the timing wheel 64 horizon, respectively, as well as drop module 74, rate limiter 72, and timer service module 70.

Queuing system 120 receives timer events at arrival rate 122 and timer insertion module 76 either inserts the received timer events into one of slots 84 of timing wheel 64 or pushes the timer events onto long horizon queue 62. As timing wheel 64 turns, timer insertion module 76 pops timer events from long horizon queue 62 and inserts the timer events into timing wheel. Rate limiter 72 selects up to a rate limit value of timer events first from wait pool 60 and then from the most recently advanced-to one of slots 84, and timer service module 70 services the selected events. Rate limiter 72 defers, at average deferral rate 128, excessive timer events for the current tick to wait pool 60. Servers 128 process selected timer events to provide average service rate 126 for queuing system 120.

If the number of timer events held by wait pool 60 exceeds a defer threshold, drop module 74 engages wait pool 60 to institute a random drop that provides an average drop rate 124 for queuing system 120.

Figure 9:
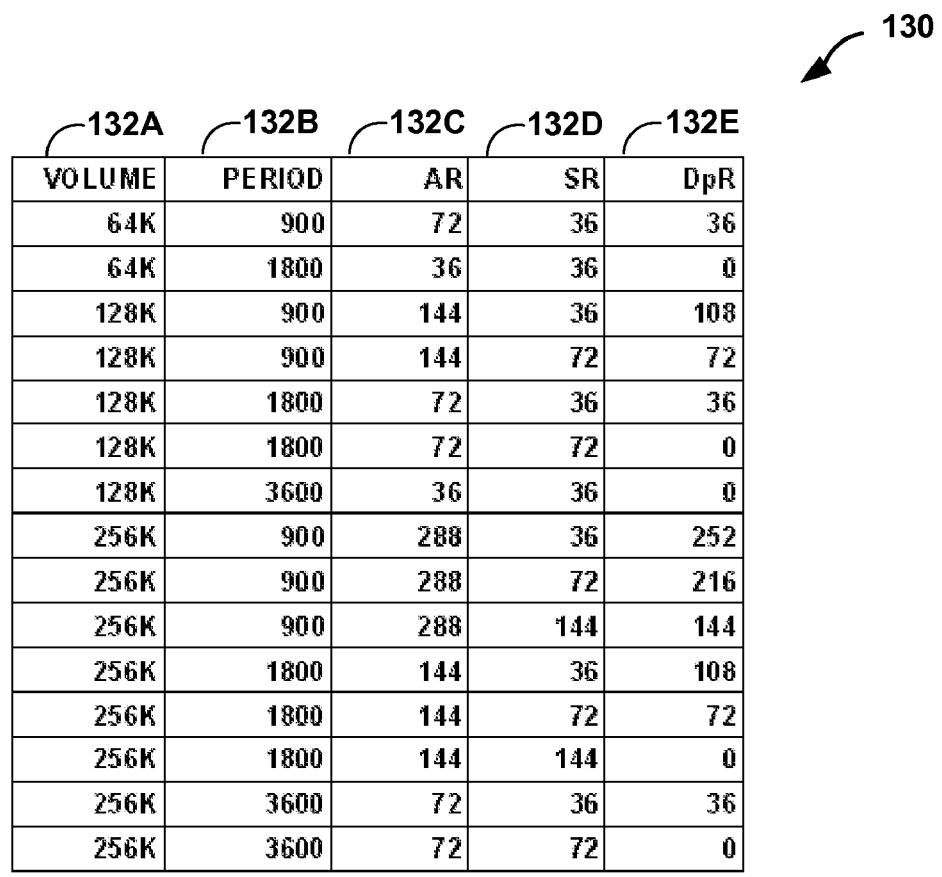
FIG. 9 is a table that a set of entries that may characterize a exemplary service rate and exemplary drop rate for the deterministic timer manager of FIG. 2.

FIG. 9 is a table 130 having a set of entries that may characterize an exemplary service rate and exemplary drop rate for deterministic timer manager 14 operating within router 20 of FIG. 2 to manage timer events for service statistics collection according to various combinations of independent variables.

In general, customer requirements stipulate the independent variables, including required service statistic volume and collection period, where the volume 132A refers to the maximum number of timers that must be handled by deterministic timer manager 14 and the collection period 132B specifies the period, in seconds, of expiry for each timer event. Arrival rate ("AR") 132C is the average number of timer events received per second by deterministic timer manager 14 and is computed as volume (i.e., a total number of service sessions 42 for which there may be a time event in deterministic timer manager 14) divided by the collection period.

Sustainable service rate ("SR") 132D the service rate is limited by the available processing capabilities of control unit 22, deterministic timer manager 14 latency and timer event expiration callback latency. That is, sustainable SR~1/(per-tick timer management+timer event expiration callback processing). Drop rate ("DpR") 132E is calculated as AR 132C minus SR 132D.

By performing the techniques described herein, deterministic timer manager 14 may provide a guaranteed service rate 132D and drop rate 132E for any given customer requirement respecting volume and period. In addition, by dropping timer events in the manner described, deterministic timer manager 14 may enable servicing of an arrival rate 132C that exceeds service rate 132D.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. A modular instance may refer to a hardware or software instance of the module, or some combination thereof.

The techniques described in this disclosure may also be embodied or encoded in a computer-readable medium, such as a tangible computer-readable storage medium, containing program code in the form of machine instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
storing, within a network device, a timing wheel data structure defining a plurality of slots, wherein the timing wheel data structure represents a span of time and the slots represent sequential time intervals;
during a first one of the time intervals, servicing up to a rate limit value of a plurality of timer events stored in a first one of the slots, wherein the rate limit value is less than a total number of the plurality of timer events stored in the first one of the time slots;
deferring at least one of the unserviced timer events from the first one of the slots to a second one of the slots that corresponds to a second one of the time intervals; and
during the second time interval, servicing at least one of the timer events deferred from the first one of the slots.

2. The method of claim 1,
wherein each one of the timer events is associated with a service session for a subscriber managed by the network device, and
wherein servicing up to the rate limit value of timer events comprises collecting service statistics for the service sessions associated with the timer events.

3. The method of claim 1, further comprising storing a data structure defining a wait pool to identify deferred timer events, and
wherein deferring at least one of the unserviced timer events from the first one of the slots comprises:
deleting the unserviced timer events from the first one of the time slots;
storing the unserviced timer events in the wait pool; and
during the second time interval, selecting at least one of the unserviced timer events in the wait pool and servicing the selected unserviced timer events.

4. The method of claim 3, further comprising modifying a timer event capacity of the wait pool responsive to memory availability for the network device.

5. The method of claim 3, further comprising dropping at least one of the unserviced timer events from the wait pool when a number of unserviced timer events stored by the wait pool exceeds a defer threshold.

6. The method of claim 5, further comprising:
upon dropping at least one of the unserviced timer events from the wait pool, marking the dropped, unserviced timer events as dropped,
wherein dropping at least one of the unserviced timer events from the wait pool comprises dropping unserviced timer events only when the unserviced timer events are not marked as dropped.

7. The method of claim 5, further comprising:
deleting the dropped, unserviced timer events from the wait pool; and
storing the dropped, unserviced timer events to one or more timing wheel slots in which the dropped, unserviced timer events were stored prior to being deferred.

8. The method of claim 1, further comprising servicing every timer event stored by the timing wheel, wherein an average timer event service rate of the network device exceeds an average timer event arrival rate of the network device.

9. The method of claim 1, further comprising:
during a third time interval, comparing a tick time of the timing wheel with a system time for the network device;
determining whether a skew between the tick time and system time is greater than a length of a time interval for the timing wheel;
determining whether a sum of (1) a number of timer events stored by a third slot that corresponds to the third time interval and (2) a number of timer events stored by a fourth slot that corresponds to a fourth time interval is fewer than the rate limit value, wherein the third time interval and the fourth time interval are contiguous in time; and
when the sum is fewer than the rate limit value, servicing the timer events stored by the third slot and the timer events stored by the fourth slot during the third time interval to synchronize the tick time and the system time.

10. The method of claim 1, further comprising servicing at least one of a plurality of timer events stored in the second one of the slots only when a number of timer events deferred from the first one of the slots is less than the rate limit value.

11. The method of claim 1,
wherein each one of the timer events specifies one or more criteria for matching one or more packet flows, and
wherein servicing up to the rate limit value of the timer events comprises collecting service statistics for packet flows that satisfy the criteria associated with the timer events.

12. A network device comprising:
a processor;
a memory storing a timing wheel data structure defining a plurality of slots, wherein the timing wheel data structure represents a span of time and the slots represent sequential time intervals;
a rate limiter executing on the processor to select up to a rate limit value of a plurality of timer events stored in a first one of the slots, wherein the rate limit value is less than a total number of the plurality of timer events stored in the first one of the time slots; and
a timer service module executing on the processor to service the selected timer events during the first time interval,
wherein the timer service module defers at least one of the unserviced timer events from the first one of the slots to a second one of the slots that corresponds to a second one of the time intervals, and
wherein the timer service module, during the second time interval, services at least one of the timer events deferred from the first one of the slots.

13. The network device of claim 12, wherein each one of the timer events is associated with a service session for a subscriber managed by the network device, and further comprising a statistics collection module to collect service statistics for the service sessions associated with the selected timer events when the timer service module services the selected timer events.

14. The network device of claim 12, further comprising an offload client to send the service statistics collected by the statistics collection module to a server.

15. The network device of claim 12, further comprising a wait pool data structure to identify and store deferred timer events,
wherein, to defer at least one of the unserviced timer events from the first one of the slots, the timer service module:
deletes the unserviced timer events from the first one of the time slots;
stores the unserviced timer events in the wait pool; and
during the second time interval, selects at least one of the unserviced timer events in the wait pool and services the selected unserviced timer events.

16. The network device of claim 15, wherein a timer event capacity of the wait pool is modifiable responsive to memory availability for the network device.

17. The network device of claim 15, further comprising a drop module to drop at least one of the unserviced timer events from the wait pool when a number of unserviced timer events stored by the wait pool exceeds a defer threshold.

18. The network device of claim 17,
wherein, upon dropping the second timer event from the wait pool, the drop module marks the dropped, unserviced timer events as dropped, and
wherein the drop module drops at least one of the unserviced timer events from the wait pool only when the unserviced timer events are not marked as dropped.

19. The network device of claim 17, wherein the drop module deletes the dropped unserviced timer events from the wait pool, and further comprising a timer insertion module to store the dropped, unserviced timer events to one or more timing wheel slots in which the dropped, unserviced timer events were stored prior to being deferred.

20. The network device of claim 12,
wherein the timer service module services every timer event stored by the timing wheel, and
wherein an average timer event service rate of the network device exceeds an average timer event arrival rate of the network device.

21. The network device of claim 12, wherein the timing wheel advances to a third slot, and further comprising a synchronization module to:
during a third time interval, compare a tick time of the timing wheel with a system time for the network device;
determine whether a skew between the tick time and system time is greater than a length of a time interval for the timing wheel; and
determine whether a sum of (1) a number of timer events stored by a third slot that corresponds to the third time interval and (2) a number of timer events stored by a fourth slot that corresponds to a fourth time interval is fewer than the rate limit value, wherein the third time interval and the fourth time interval are contiguous in time,
wherein, when the sum is fewer than the rate limit value, the timer service module services the timer events stored by the third slot and the timer events stored by the fourth slot during the third time interval to synchronize the tick time and the system time.

22. The network device of claim 12, wherein the timer service module services at least one of a plurality of timer events stored in the second one of the slots only when a number of timer events deferred from the first one of the slots is less than the rate limit value.

23. The network device of claim 12, further comprising a plurality of packet forwarding engines, wherein each packet forwarding engine manages one or more service sessions for the network device and includes a separate instance of the timing wheel, rate limiter, and timer service module.

24. A non-transitory computer-readable medium comprising instructions for causing a programmable processor to:
   store, within a network device, a timing wheel data structure defining a plurality of slots, wherein the timing wheel data structure represents a span of time and the slots represent sequential time intervals;
   during a first one of the time intervals, service up to a rate limit value of a plurality of timer events stored in a first one of the slots, wherein the rate limit value is less than a total number of the plurality of timer events stored in the first one of the time slots;
   defer at least one of the unserviced timer events from the first one of the slots to a second one of the slots that corresponds to a second one of the time intervals; and
   during the second time interval, service at least one of the timer events deferred from the first one of the slots.

25. The non-transitory computer-readable medium of claim 24, wherein the instructions further cause the processor to:
   store a data structure defining a wait pool to identify deferred timer events, and
   wherein, to defer at least one of the unserviced timer events from the first one of the slots, the instructions cause the processor to:
   delete the unserviced timer events from the first one of the time slots;
   store the unserviced timer events in the wait pool; and
   during the second time interval, select at least one of the unserviced timer events in the wait pool and servicing the selected unserviced timer events.

* * * * *